United States Patent Office 3,349,869
Patented Oct. 31, 1967

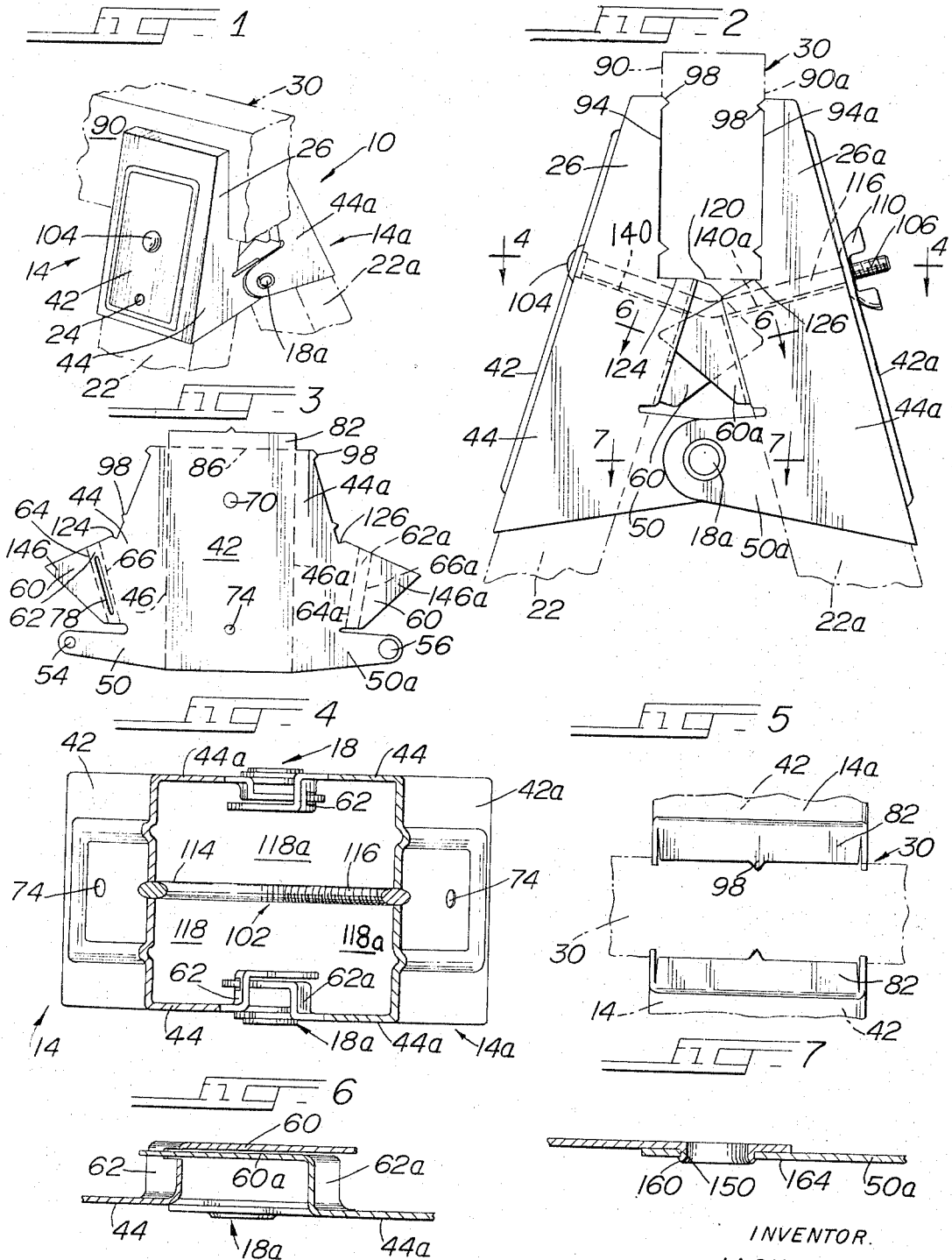

3,349,869
SAWHORSE BRACKET
Jack Evans, Box 55, Rte. 1, Grant Park, Ill. 60940
Filed May 27, 1966, Ser. No. 553,522
14 Claims. (Cl. 182—226)

ABSTRACT OF THE DISCLOSURE

A sawhorse bracket for holding a beam and a pair of supporting legs in assembled relation and comprising a pair of cooperating, identical, sheet metal components pivotally connected through integrally formed hinge elements and including pivotally movable tongues operable grippingly to interengage the support legs slidably inserted into leg-receiving sockets formed in the bracket.

---

The present invention relates generally to brackets and structural joints or connectors finding utility in the setting up of sawhorses, tressels, and related structures. More particularly, the invention is directed to an improved bracket or clamping device of the type adapted to receive lengths of 2 x 4's as legs and to carry a cross beam.

Many types of structural joints or connectors for scaffolds, carpenters' horses and the like are known in the prior art. Not only have these structural joints taken numerous and various physical forms and arrangements, but in addition, many different manufacturing techniques, materials and fabrication techniques have been used. Many of the known prior art structures have been relatively complicated in form and costly and time consuming in fabrication. Others have lacked the requisite versatility and adaptability. Notwithstanding the considerable attention that has been directed to the subject, no completely satisfactory connector has heretofore been produced, each joint or connector having one or more objectionable features which have limited and impaired its usefulness. No prior art device has been found to provide a completely satisfactory answer to the long recognized need. It is the aim of this invention to provide effective solutions to the existing problems to the end that an improved connector or joint having general utility for the uses described may be realized.

The present invention, therefore, is directed to and has for one of its objects the provision of a sawhorse bracket or clamping assembly of simplified form, high mechanical strength, versatility and adjustability, and lending itself to low cost manufacturing methods.

It is a principal object of the invention to provide a lightweight, sheet metal bracket or clamp which may be quickly and simply applied to and removed from a pair of supporting wooden legs and which will carry a crossbeam, whereby the component parts of a sawhorse assembly or tressel may be rapidly assembled for use and may be easily disconnected for packing and storage.

It is another important object of the invention to provide a pair of cooperating hinge-joined and bolt-coupled bracket members adapted to receive 2 x 4 legs therewithin and to support a beam thereacross, and in which the supporting legs and the supported crossbeam are firmly and securely held or gripped and maintained tightly in place.

It is a further object of the invention to provide a sawhorse bracket or beam-supporting joint which includes two principal and facing cooperating metallic jaws which are hingedly joined and which carry integrally formed leg gripping tongues pivotal with the beam-clamping jaws to engage and firmly grip wooden support legs inserted into sockets formed in the bracket.

A related object of the invention is to provide a sawhorse bracket or clamp having integrally formed sawhorse leg gripping elements disposed for intercoupling and sliding engagement.

It is an important feature of the bracket of the present invention, which feature contributes materially to reduce overall cost of the device, that the two cooperating body members of the bracket are fabricated from identical stampings, eliminating the need for separate dies.

It is another important feature of the bracket of the invention that the hinge means are integral with the principal structures, obviating the need for separate components and reducing the overall cost of the final mechanism.

Additional objects and aims of the invention include the following:

To provide a sawhorse bracket or similar structure which is light in weight, compact in form and mechanically strong and stable; to provide a bracket or structural joint in which a supported beam is firmly held against lateral movement by means of tooth like projections integrally formed with the opposed cooperating jaws of the bracket; to provide a sawhorse bracket in which the adjustable means for urging the pivotally disposed opposing jaws toward one another to grip the supporting legs and to clamp upon the supported beam comprises a nut and bolt assembly, the bolt extending between and connecting opposed cooperating body members of the bracket, and the bolt being bent intermediate its ends to present upwardly and laterally diverging portions; to provide a sawhorse bracket assembly in which the bolt means for urging opposed jaw members toward each other may serve also as an auxiliary support for a cross beam gripped in the jaws of the bracket; to provide a sawhorse bracket in which the bolt means for urging opposed jaw members into engagement against a beam supported in the bracket and to urge opposed sliding tongues into engagement with respective sawhorse legs inserted into the bracket serves also as stop means to limit upward axial insertion of the sawhorse legs into the cooperating body members of the bracket; to provide a sawhorse bracket in which the complementary cooperating body members comprise shaped housings or channels formed from sheet metal stampings having identical peripheral contour; to provide a sawhorse bracket in which the complementary cooperating members have formed therewith integral intercoupling and sawhorse-leg-engaging elements; and to provide a sawhorse bracket or clamp comprising two pivotally joined cooperating body members, each member having integrally formed front and rear walls which define wing elements, one of the wing elements including a through slot constituting a wing-receiving opening.

Other and further objects, advantages, and features of the invention will become apparent from a reading of the following specification taken in conjunction with the drawing in which:

FIGURE 1 is a perspective view of a sawhorse bracket embodying the principles of the invention and showing the associated parts in broken lines;

FIGURE 2 is a front elevational view of a sawhorse bracket embodying the invention and showing, in broken lines, the manner of engagement of supporting legs and a supported beam;

FIGURE 3 is a schematic representation of the stamped sheet metal blank from which the complementary members of the bracket of the invention are formed;

FIGURE 4 is a horizontal cross sectional view taken substantially on the line 4—4 of FIGURE 2;

FIGURE 5 is a fragmentary top plan view of the sawhorse bracket shown in FIGURE 1;

FIGURE 6 is an enlarged fragmentary cross sectional view taken on the line 6—6 of FIGURE 2 and showing the hingedly-pivotal leg-engaging elements of the sawhorse bracket; and FIGURE 7 is a fragmentary cross sectional view taken on the line 7—7 of FIGURE 2 and showing a preferred form of the integrally formed hinge of the invention.

The aims and objects of the invention are accomplished by providing in a bracket or clamping device a pair of identical, facing, hingedly connected body members each adapted to receive a supporting wooden leg therewithin, the two members cooperating to grip therebetween a beam supported in a saddle of the bracket. Adjustable clamping means which extend between opposed side walls of the cooperating facing bracket elements are adapted to bring the upper portions of the brackets toward each other and into firm engagement with the supported beam. At the same time, pointed tongues, integrally formed with the bracket members, bite into the support legs to provide a firm and stable structure.

Referring more particularly to the drawing, there is shown in FIGURES 1 and 2, for the purpose of illustrative disclosure, a preferred embodiment of the bracket or clamping device of the invention, incorporating the teachings thereof. The bracket 10 illustrated comprises a pair of facing body members 14 and 14a connected for relative pivotal movement by means of hinges 18 and 18a which, in the preferred embodiment of the invention shown, and as seen most clearly in FIGURES 4, 6 and 7, are integrally formed with the body members 14 and 14a.

Each body member 14 and 14a of the bracket 10 is adapted to receive upwardly therewithin an upper end portion of a length of 2 x 4 lumber 22 and 22a, the lengths serving as legs of a sawhorse or other structure of the type in which the present invention finds utility. The legs diverge downwardly at a convenient stance angle, to ensure the requisite stability. Also, as clearly illustrated in FIGURES 1 and 2, the bracket 10 defines at its upper jaw portions 26 and 26a a saddle adapted to seat and retain a cross beam 30 to be carried in and supported by the bracket 10.

An important feature of the invention contributing to the overall economy of manufacture of the improved bracket of the invention is that the individual, coupled body members 14 and 14a are stamped from a single die. The general shape or contour of the stamped blanks 40 is illustrated schematically in FIGURE 3. The sheet metal blank 40 includes a principal panel 42, which forms the side wall in the ultimate formed bracket, and front and rear walls 44 and 44a. The latter are integrally joined to the principal panel 42 at fold lines 46 and 46a. A pair of wings 50 and 50a or arms extend outwardly of the respective front and rear walls 44 and 44a, each wing 50 and 50a having formed therein a hole or opening 54 and 56 used in forming the hinge structure of the invention, as described below. Also integrally joined to the front and rear walls 44 and 44a are tongues 60 and 60a extending generally parallel to the front and rear walls 44 and 44a and joined thereto by means of intermediate webs 62 and 62a. In the final structure (FIGURE 4) the webs extend generally transversely of the front and rear walls. In FIGURE 3 the webs 62 and 62a are shown as bounded by fold lines 64 and 66 and 64a and 66a.

A bolt hole 70 is provided in the principal panel or side wall 42 in the upper portion thereof. One or more smaller holes 74, also formed in the principal panel 42, comprise convenient means by which a nail or screw (not shown) may be driven or otherwise fastened into the legs 22 and 22a which carry the bracket. As clearly shown in FIGURE 3, one of the webs 62 is stamped to provide an elongated slot 78, the slot being of a lateral width and of sufficient length to permit passage of a tongue 60a of a cooperating body member slidably therethrough for a purpose to be described more fully hereinbelow. A top flange or wall 82, comprising an integral extension of the principal panel 42 and shown in FIGURE 3 as separated therefrom by a fold line 86, is angled in the final completed structure so as to extend inwardly toward the beam-receiving channel formed between the two body members of the bracket. The flange 82 itself is substantially perpendicular to the facing surface 90 of the cross beam 30. In the final assembled structure, the edge portions 94 and 94a of the front and rear walls 44 and 44a abut and bear against the side surface 90 of the beam 30, and points or teeth 98 formed on the edges of the beam-abutting front and rear walls 44 and 44a and the top flange 82 bite into the beam 30 to ensure firm gripping thereof.

Referring now to FIGURES 2 and 4, and particularly to FIGURE 2, a bolt 102 having a head 104 at one end and threads 106 at the other end is inserted through the bolt holes 70 in the side walls 42 and 42a of the body members 14 and 14a and retained in place by means of a wing nut 110 which is threaded on the end of the bolt 102. The bolt and nut assembly serves not only as means for bringing the jaw portions 26 and 26a of the body members 14 and 14a into firm engagement with the cross beam 30 extending therebetween but the under surfaces of the angled and upwardly diverging arms 114 and 116 of the bolt 102 comprise mechanical stop means limiting upward insertion of the legs 22 and 22a into the leg receiving openings or channels 118 and 118a defined by the principal panel 42, front and rear walls 44 and 44a, and webs 62 and 62a. The bracket surfaces as viewed in transverse section, form a generally C-shaped guideway into which the sawhorse legs are slidably received, as seen most clearly in FIGURE 4.

As shown in FIGURES 1 and 2, and particularly in FIGURE 2, the lower face 120 of the beam 30 bottoms on and is supported upon shoulders 124 and 126 extending generally horizontally and being disposed transversely of the beam-engaging vertical edges 94 and 94a of the walls 44 and 44a. Also, as clearly illustrated in FIGURE 2, the bolt 102, which in vertical section appears as a flattened V, lies below and out of the path of the beam 30, the latter being supported in the saddle defined by the shoulders 124 and 126 and the jaw edges 94 and 94a. At the same time, the bolt extends through the principal panels 42 and 42a well above the hinges 18 and 18a so that the wing nut may be tightened on the bolt with minimum mechanical effort.

With the 2 x 4 legs 22 and 22a inserted upwardly into their respective sockets 118 and 118a, and with the upper end faces 140 and 140a of the legs in abutment against corresponding arms 114 and 116 of the bolt 102, and with the cross beam 30 inserted into the saddle between the jaws 26 and 26a, as the wing nut 110 is tightened upon the threaded end of the bolt, the jaws 26 and 26a of the bracket 10 are brought toward each other to engage the side walls or lateral faces 90 and 90a of the beam 30. At the same time, the angular or pointed ends 146 and 146a of the tongues 60 and 60a slide through their respective slots 78, move laterally into the leg receiving sockets 118 and 118a to engage and penetrate the sides 144 and 144a of the support legs 22 and 22a to engage the legs and hold them tightly in place, all as illustrated in FIGURE 2. As illustrated in FIGURE 4, each of the component body members 14 and 14a of the bracket 10 of the invention couples with the other in that a tongue 60 of one bracket extends into a corresponding slot 78 of the other member to impart stability and strength to the overall structure.

The hinges 18 and 18a which interconnect the body members 14 and 14a of the bracket 10 are integral elements of the bracket body members, being formed, in the preferred embodiment of the invention illustrated, from the same sheet metal of which the bracket members themselves are fabricated. Of the two holes 54 and 56 punched in the wings 50 and 50a of the sheet metal blank 40, one hole 54 is of a smaller diameter than the other hole 56. An annular shoulder or collar 150 is formed about the smaller hole 54 to extend substantially transversely of the face 152 of the wing 50, the outer diameter or dimension of the collar 150 being sized to permit the collar to be received through the opening 56 in a corresponding wing 50a of the other body member of the bracket. The shoulder 150 is preferably in substantially contiguous abutment with the edge wall 154 defining the opening 56, whereby relative pivotal movement of the shoulder 150 within the wing 50a is facilitated. After insertion of the collar 150 through the cooperating opening 56, the free edge portion 160 of the collar 150 is swaged radially outwardly to overlie the face 164 of the wing 50a to form the hinge structure illustrated in FIGURES 6 and 7.

It will be evident upon a consideration of FIGURE 4 that the two hinges 18 and 18a are formed from the sheet metal of the bracket 10 in such a manner that the two body members 14 and 14a are identical. Fabrication of the two principal portions of the bracket of the invention from identical stampings effects significant savings in the overall cost of manufacture.

The collapsing or the disassembly of the structure illustrated in FIGURES 1 and 2 may be carried out simply and rapidly, it being necessary only to loosen the wing nut, withdraw the beam, and pivot the lower portions of the bracket outwardly to release the legs.

Upon a consideration of the foregoing description, it will be appreciated that there has been provided a simple yet highly effective bracket structure of high mechanical strength, the whole being imaginatively engineered to ensure minimum production costs.

While the disclosure is of a preferred embodiment of the bracket or clamp, and while there has been provided a description of preferred methods for assembly and fabrication of the clamp of the invention, it is apparent that numerous modifications and variations in structural detail and in manufacturing techniques may be made without departing from the underlying principles of the invention. It is, therefore, desired by the following claims to include within the scope of the invention all such variations and modifications by which substantially the results of this invention may be obtained through the use of substantially the same or equivalent means.

What is claimed is:

1. A sawhorse bracket for use in holding a beam and a pair of supporting legs in assembled relationship, comprising a pair of facing hingedly connected complementary body members each provided with a downwardly opening socket disposed slidably to receive therein upper ends of bracket-supporting legs, upper portions of said facing body members defining therebetween a laterally and upwardly opening channel dimensioned to receive a beam therein for support thereof, each said body members comprising a sidewall and spaced parallel front and rear walls integrally formed with said side walls and extending transversely thereof, hinge means pivotally coupling corresponding said front and rear walls to each other at lower inwardly extending wing portions thereof, tongues integral with and offset inwardly of said front and rear walls and extending generally parallel thereto, each said tongues being pivotal with its corresponding body member toward a side wall of an opposed body member to engage a facing surface of a leg received in said socket of said opposed body member, web means integral with said tongues and said side walls and extending between and joining said tongues with said side walls, a web means of one said complementary body members having formed therein an elongated slot aligned slidably to receive therethrough a free end of a cooperating tongue of the other of said complementary members, and adjustable means extending between and interconnecting opposed side walls of said bracket at corresponding positions intermediate upper and lower extremes of said side walls and operable to draw upper portions of said body members toward each other to bring corresponding upper portions of said front and rear walls of said body members into clamping engagement with a beam supported in said channel therebetween.

2. A bracket as set forth in claim 1 wherein said sidewalls and said leg-receiving sockets are disposed to diverge downwardly to define a stance angle of sawhorse legs slidably received within said socket.

3. A bracket as set forth in claim 1 wherein said means interconnecting opposed said side walls comprises a threaded bolt extending through bolt holes provided in said sidewalls, and a cooperating nut; said interconnecting means adapted to clamp inwardly facing edge portions of said front and rear walls upon a beam supported in said beam receiving channel.

4. A bracket as set forth in claim 1 and further comprising tooth-like projections formed on beam-engaging edges of said inwardly extending front and rear walls and arranged to grip and bite into opposite side faces of said beam supported in said channel.

5. A bracket as set forth in claim 1 wherein leg-receiving sockets in said members diverge downwardly, each said socket being substantially C-shaped in transverse contour and each said socket being adapted to receive an upper end portion of a length of 2 x 4 therein for support of said bracket thereon and said beam thereabove.

6. A bracket as set forth in claim 3 wherein said bolt has angularly disposed portions one of which is provided with a head and the other portion with a threaded section, said portions extending inwardly and downwardly of lateral extremes thereof, whereby a mid region of said bolt in vertical alignment with said beam lies below and substantially clear of a path traversed by said beam supported in said bracket.

7. A bracket as set forth in claim 1 wherein inwardly extending and pivotal free edges of said tongues include pointed ends facilitating partial penetration of said tongues into said legs for firm gripping thereof.

8. A bracket as set forth in claim 6 wherein said angularly disposed portions of said bolts extend through and generally transversely of said leg-receiving sockets and constitute stop means limiting axially insertion of sawhorse legs into said sockets.

9. A bracket as set forth in claim 1 wherein said webs extend generally parallel to respective side walls to define in combination with said side walls, and said front and rear walls leg-receiving slideways limiting pivotal movement of and lateral shifting of said sawhorse legs with respect to corresponding said sidewalls.

10. A bracket as set forth in claim 1 wherein said hinge means comprises, in combination, an annular flange integrally formed in a wing portion of one of said front and rear walls of one of said complementary members, said flange extending substantially transversely of said wing portion to define an annular shoulder, said shoulder being snugly received in a registering opening formed in an overlying wing of the other of said complementary members in an adjacent one of said front and rear walls thereof, an edge portion of an annular wall defining said opening being in substantially contiguous abutment with said shoulder to preclude relative sliding movement therebetween while permitting pivotal movement, free portions of said flange extending through said opening and being swaged radially outwardly to overlie said wing of said complementary member to lock said flange in said opening and to preclude axial withdrawal of said flange therefrom.

11. A bracket as set forth in claim 10 wherein in each said complementary members in opposed wing portions of said front and rear walls thereof one said wing portion carries an integral flange and the other of said wing portion has a flange-receiving opening formed therein.

12. A bracket as set forth in claim 1 wherein said complementary members comprise shaped housings formed from sheet metal stampings having identical peripheral contours.

13. A bracket as set forth in claim 1 wherein each said complementary members is identical in final form and structure.

14. A bracket as set forth in claim 3 wherein said bolt is shaped to define in vertical section a V with generally laterally extending and upwardly diverging arms.

References Cited

UNITED STATES PATENTS

| | | | |
|---|---|---|---|
| 2,112,778 | 3/1938 | Kacena | 182—186 |
| 2,561,864 | 7/1951 | Hollywood | 182—226 |
| 2,819,931 | 1/1958 | Chesney | 182—226 |

REINALDO P. MACHADO, *Primary Examiner.*